United States Patent [19]
Kaikuranta et al.

[11] Patent Number: 6,031,825
[45] Date of Patent: Feb. 29, 2000

[54] INFRARED AUDIO LINK IN MOBILE PHONE

[75] Inventors: Terho Kaikuranta, Turku; Markku Lipponen, Tampere; Seppo Jarvensivu, Salo; Toni Sulavuori, Tampere, all of Finland

[73] Assignee: Nokia Mobile Phones Limited, Salo, Finland

[21] Appl. No.: 08/685,053

[22] Filed: Jul. 23, 1996

Related U.S. Application Data

[63] Continuation-in-part of application No. 08/567,634, Dec. 5, 1995, Pat. No. 5,636,264, which is a continuation of application No. 08/108,085, Aug. 17, 1993, abandoned.

[30] Foreign Application Priority Data

Aug. 18, 1992 [FI] Finland ................................ 923693

[51] Int. Cl.[7] .................................................. H04M 11/00
[52] U.S. Cl. ........................... 370/296; 370/279; 370/526
[58] Field of Search ..................... 370/279, 296, 370/312, 525, 526, 527, 506, 286, 295

[56] References Cited

U.S. PATENT DOCUMENTS

| | | | |
|---|---|---|---|
| 4,317,234 | 2/1982 | Kunde et al. | 455/606 |
| 4,450,319 | 5/1984 | Lucey | 455/89 |
| 4,456,793 | 6/1984 | Baker et al. | 179/99 |
| 4,465,902 | 8/1984 | Zato | 379/61 |
| 4,543,654 | 9/1985 | Jones | 370/445 |
| 4,856,046 | 8/1989 | Streck et al. | 379/56 |
| 4,924,456 | 5/1990 | Maxwell et al. | 370/296 |
| 5,086,510 | 2/1992 | Guenther et al. | 455/90 |
| 5,315,645 | 5/1994 | Matheny | 379/144 |
| 5,321,542 | 6/1994 | Freitas et al. | 359/172 |
| 5,343,319 | 8/1994 | Moore | 359/152 |
| 5,446,783 | 8/1995 | May | 379/59 |
| 5,799,041 | 8/1998 | Szkopek et al. | 375/259 |
| 5,878,221 | 3/1999 | Szkopek et al. | 370/488 |

FOREIGN PATENT DOCUMENTS

| | | |
|---|---|---|
| A-0027833 | 6/1981 | European Pat. Off. . |
| 483549 A2 | 6/1992 | European Pat. Off. ........ H04B 10/10 |
| 923693 | 4/1993 | European Pat. Off. . |
| 0 027 833 | 6/1981 | Germany . |
| 4005517 | 5/1991 | Germany ........................ H04B 10/24 |
| 466 374 | 2/1992 | Sweden ......................... H04B 10/22 |
| WO91/20139 | 12/1991 | WIPO ............................. H04B 10/00 |
| WO 92/10046 | 11/1992 | WIPO . |
| WO-A-9210046 | 11/1992 | WIPO . |

OTHER PUBLICATIONS

"A Multipurpose Cordless Phone for Use in Both Private and Public Systems", IEEE 1989 International Conference on Consumer Electronics, Jun. 6, 1989, pp. 28–29.
IEEE 1989 International Conference on Consumer Electronics Jun. 6, 1989, Rosemont, IL, USA pp. 28–29, by S. Lipoff et al. "A Multipurpose Cordless Phone For Use in Both Private and Public Systems".

*Primary Examiner*—Dang Ton
*Assistant Examiner*—Tuan Q Ho
*Attorney, Agent, or Firm*—Perman & Green, LLP

[57] ABSTRACT

A system for providing an IR-link between a mobile phone and its accessories to transmit audio, control, and data signals between them in an apparent full-duplex real time mode using a conventional half-duplex IR-transceiver with suitable FIFO registers and control means. The "direction" of the half-duplex channel is "switched" by the system which may be embodied in an IR-link module, having transmission channels for digital full-duplex audio signals, slow data messages and fast data messages, and for some control data. The module is connected to the baseband of a phone through a baseband interface (BBIF) and communicates through a media interface (MIF) and an infrared interface (IRIF) with free air space or a lightguide. A link-specific low-level protocol is used for audio and slow data message transmission but the link hardware of the module may also support other protocol implementations. The system may be implemented in hardware and/or software.

25 Claims, 8 Drawing Sheets

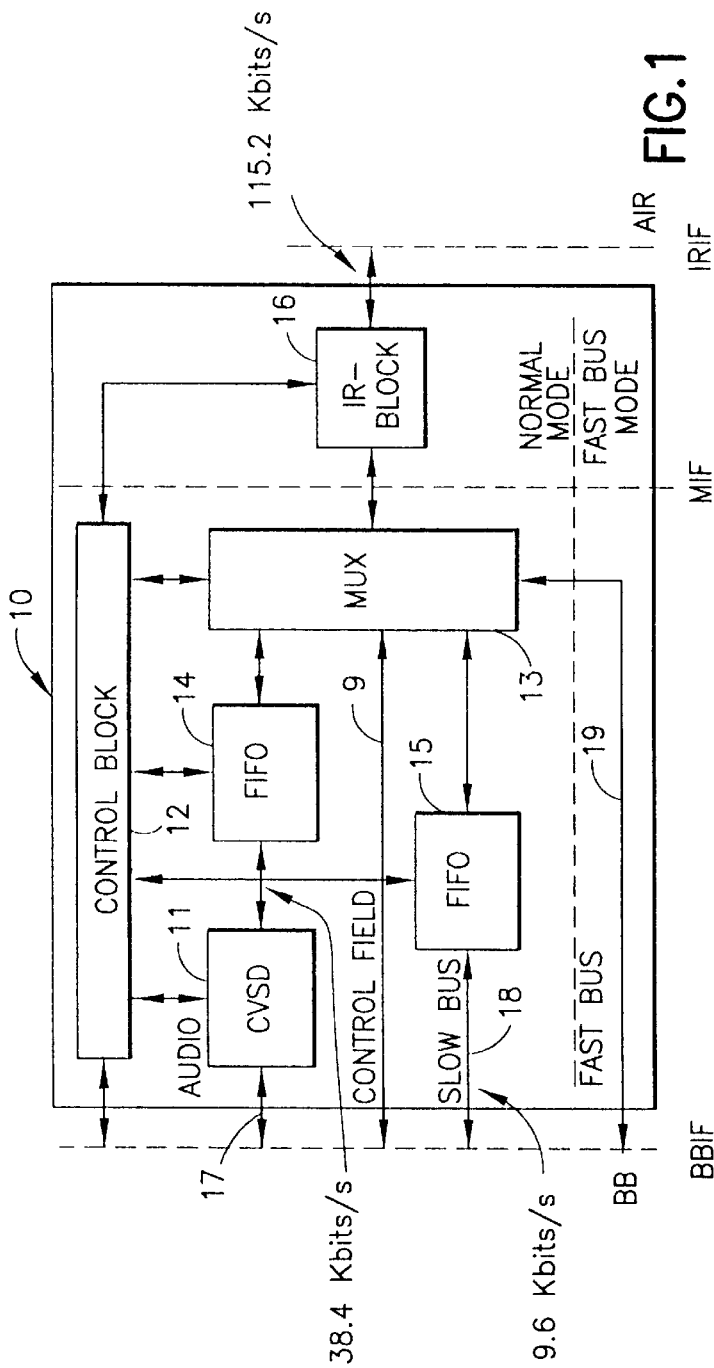
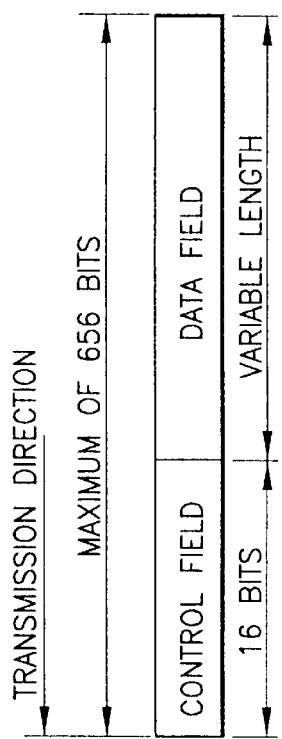
FIG.1
FIG.2

INFRARED AUDIO LINK IN MOBILE PHONE

CROSS-REFERENCES

The present application is a continuation-in-part of, and involves inventions and technology related to that disclosed in, U.S. application Ser. No. 08/567,634, filed Dec. 5, 1995, now U.S. Pat. No. 5,636,264 which is a continuation of the application under Ser. No. 08/108,085, filed Aug. 17, 1993, now abandoned.

BACKGROUND OF THE INVENTION

1. Field of the Invention

The present invention relates to the telephony art and more particularly to a system utilizing a wireless digital link for transmitting audio and data in full-duplex mode between a phone, e.g., a radio or mobile phone, and its accessories.

2. Prior Art

The conventional system connector in a radio or mobile phone has several disadvantages. Among these are 1) small mechanical tolerances are needed for accurate positioning of the connector or accessory, 2) electrical interference is easily induced in the cables, and 3) the reliability of the connector is not good. A wireless or cableless link, such as an infrared (IR) link, between the mobile phone and its accessories can be used to overcome these problems. Among the advantages of such links are 1) alignment of the link connectors does not have to be very accurate, 2) no cables are needed, 3) lightguides can be used to connect distant devices in a noisy environment without induced interference, and 4) the data interface can be hermetically sealed. Also, an IR link, as compared to an RF link, needs no EMS classification, the operating range is locally limited, and a transmission does not penetrate through alls, etc.

Problem to be Solved:

However, there is a compatibility problem between real time audio transmission and the limitations of commercially available IR-transceivers in that there is a long receiver set-up time after transmission due to the receiver saturation. Consequently there is a need for some approach to overcome this IR-transceiver timing problem in order to take advantage of wireless or cableless IR link technology.

Objects:

It is therefore an object of the present invention to provide a system involving a method and means for implementing a wireless, e.g., IR, link between a phone, such as a mobile phone, and its accessories or another phone to transmit audio, control, and logical signals while overcoming the prior art timing problem.

It is another object to provide a system involving a method and means that will implement such an IR link so as to make it possible to transfer full-duplex real time audio or speech using a low speed half-duplex infrared (IR) link.

It is a further object to provide such a system that can be additionally adapted to implement the sending of a combination of real time speech and data over a low speed IR link at the same time.

SUMMARY OF THE INVENTION

The present invention relates to a system embodying a method and means for providing a wireless, e.g., IR, link between a phone, such as a mobile phone, and its accessories or another phone to transmit audio, control, and logical signals between them. The invention is directed to making it possible to transfer full-duplex real time audio with a low speed half-duplex IR link by using a suitable system to switch "the direction" of the half-duplex channel. In contrast to the system disclosed in co-pending parent U.S. application Ser. No. 08/567,634, which handles either speech or data signals, the present invention provides a system that can be additionally adapted to implement the sending of a combination of real time speech and data over a low speed IR link at the same time. The invention can also be implemented using various other devices and accessories, and electrical wires may be used for transmitting signals between devices rather than IR, although IR transmission is preferred.

More specifically, a preferred embodiment of the invention involves a short distance digital IR link which is capable of data and full-duplex audio or speech transmission and that supports digital and analog phones, single accessory connection, economical accessories, lightguides, a 3 V operating voltage, and ASIC implementation. It particularly supports fast data channel (fastbus-message), slow data channel (slowbus-message), and single audio channel transfer between a mobile phone and a single accessory device, and may be embodied in an infrared link module, e.g., of a type such as disclosed in the Ser. No. 08/567,634 application, which module has transmission channels for digital full-duplex audio signals, slowbus- and fastbus-messages, and for some control data. This module may be adaptable for use as an integrated part of a mobile phone and its accessories, and the same module can be used both in the phone and in an accessory device. In a mobile phone, the link module is connected to the baseband of the phone through a baseband interface (BBIF) and communicates through a media interface (MIF) and an infrared interface (IRIF) externally with free air space or a lightguide. A link-specific low-level protocol is used for audio and slowbus-message transmission but the link hardware of the module may also support other protocol implementations. The invention may be embodied in hardware or in software or both.

Operation of the IR link in full-duplex manner is based on multiplexing/demultiplexing wherein audio and data signals from different channel buffers are converted for transmission into signals with a suitable format for infrared media through the media interface or MIF and externally generated received formatted signals are reconverted for storage in the buffers. As noted above, the compatibility problem between real time audio transmission and limitations of the commercially available IR-transceivers, wherein there is a long receiver set-up time after transmission due to the receiver saturation, requires a special signal processing method. This problem is overcome in accordance with the invention by collecting the audio signals for a longer period and then sending them much faster over the IR link and also decoding them accordingly. Therefore, there is time left to change transmission direction making a full-duplex transmission possible over a half-duplex media. This solution involves the utilization of a FIFO buffer for holding collected audio signals and may also be applied to slowbus-messages.

The link can be operated in two exclusive signal handling modes, one transferring audio signal and slowbus-messages and the other transferring fastbus-messages. In one handling mode, the Normal mode, the slowbus data is multiplexed with the audio signals in one frame. In the other mode, the Fastbus mode, neither the audio signal nor the slowbus-messages are transmitted, and only fastbus data is transmitted. The mode can be changed at any time during the link connection. A number of control bits are transferred in the transmitted signal frame and can be used for such purposes as accessory identification and the like. When inactive, the link enters into an Idle mode to save the phone battery and is activated by sending or receiving data. If the connection is lost during the transmission, the link can recover from short period interrupts and it may enter into the Idle mode when the interrupt is longer than a specified maximum recovery time.

BRIEF DESCRIPTION OF THE DRAWINGS

FIG. 1 is a schematic block diagram of the functional components of a transmission link module in accordance with the present invention.

FIG. 2 illustrates a basic signal frame structure containing control field bits for controlling the state machine of the control block component of the link module of FIG. 1.

DETAILED DESCRIPTION OF THE PREFERRED EMBODIMENTS

Figure 3:
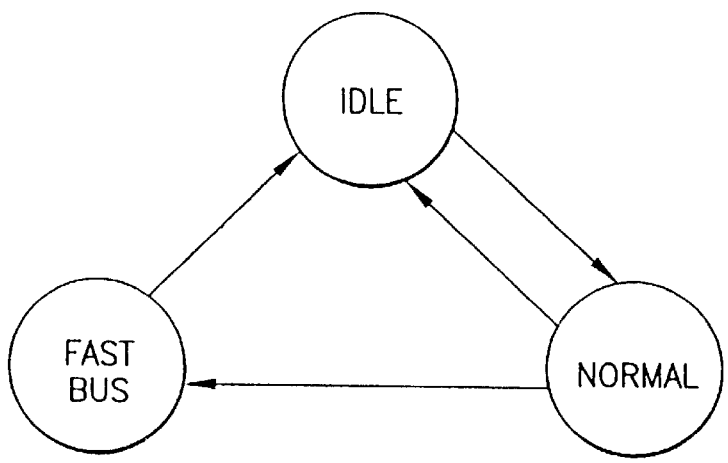
FIG. 3 illustrates the three different operation modes in which the activated link module of FIG. 1 can exist, i.e., an Idle mode, a Normal mode, and a Fastbus mode.

A preferred embodiment of a method and means for use in a wireless or wired system for audio (or speech or voice) and data transmission in accordance with the present invention is shown in modular form in FIG. 1. As seen in the Figure, the module or system of the invention may broadly involve a combination of functional blocks forming a transmission link and including: an audio input, e.g., a modulating device 11, such as a continuously variable slope delta (CVSD) modulator; a control block 12; a multiplexer/demultiplexer 13 (hereinafter multiplexer) which may include a processor, e.g., a digital signal processor (DSP) or RISC processor; FIFO registers 14 and 15; and a media driver 16. The media driver 16 is a physical component, such as may be incorporated in a phone or an accessory, and acts to send and receive multiplexed data over the link. The remainder of the link can be variously implemented in hardware (HW) or software (SW), or both. In the present invention, the media driver 16 is preferably an infrared (IR) block, including a pulse shaper and transceiver, but the invention may also be implemented in other wireless or wired system designs with a different type of driver for transmission in other media.

Accordingly, a preferred embodiment of the invention, as broadly illustrated in FIG. 1, is embodied in a preferred form of IR link module 10, which contains the combination of functional blocks, 11–15, with the media driver as an IR-block 16, and which has three link interfaces associated therewith. Specifically, the link module 10 is connected to the baseband (BB) of a host system, such as a mobile phone, through a baseband interface (BBIF) and communicates signals therefrom, through a media interface (MIF) and an infrared interface (IRIF), externally with free space, i.e., the air (wireless), or a lightguide or other cable. The BBIF specifies how the link module 10 is connected to the host system or phone; the IRIF specifies how signals are transmitted externally between the IR-block 16 and free space or lightguides; and the MIF specifies how the blocks 11–15, which include the multiplexer 13, are connected to the media driver, that is, the IR-block 16. The details of these interfaces and the other components and their operations will be described in detail below. However, an initial brief description will first be presented.

For convenience of reference, as a number of abbreviations will be used, their meanings are set forth as follows:

| ABBREVIATIONS | |
|---|---|
| ASIC | Application Specific Integrated Circuit |
| BBIF | Baseband Interface |
| CVSD | Continuously Variable Slope Delta modulation |
| DSP | Digital Signal processor |
| fastbus | Fast data channel |
| HW-block | Hardware parts of the link |
| HWIM | Hardware based design and implementation |
| IR | Infrared |
| IR-block | Converter between digital signals and IR radiation |
| IrDA | Infrared Data Association |
| IRIF | Infrared Interface |
| IrMA | Infrared Multiple Access |
| slowbus | Slow data channel |
| MIF | Media Interface |
| MIP | Media Interface Protocol |
| PCM | Pulse Code Modulation |
| RISC | Reduced Instruction Set Computer |
| SW-block | Software parts of the link |
| SWIM | Software based design and implementation |

The three INTERFACES may be briefly defined in the following manner: The BBIF INTERFACE or Baseband interface specifies how the IR link module is connected to the host system (phone or accessory). The MIF INTERFACE or Media interface specifies how the SW-block and HW-block, which include a multiplexer/demultiplexer, are connected to a media driver. The IRIF INTERFACE or Infrared interface specifies how signals are transmitted back and forth externally between the IR-block and free space (air) or lightguides.

The principle of operation briefly is based on a state machine of the control block 12 which controls the reading, writing, and multiplexing of the signal data and signal frame processing. The state machine is controlled by control field bits in the signal frame during reception and by incoming data during transmission, along with a few input signals, as will be described.

The basic signal frame structure consists of a Control Field followed by a Data Field as shown in FIG. 2. The Control Field, which preferably contains 16 bits, defines the structure of the Data Field. The content of the Data Field can be different for different frames, but the control and Data Fields combined preferably have a maximum of 656 bits. Dynamic allocation of the data structure of the frame is utilized due to the data adaptation of the link. The link operates on the master/slave principle where the phone is a master and an active accessory device is a slave. The accessory device can only respond to the master, and the link must be opened by the master. However, a slave originated transmission is possible.

MODES OF OPERATION

The link is active when the IR module blocks are useable, that is, when the circuits are powered and software is running, and data exchange between the phone, across BBIF, and an accessory, across IRIF, could occur at any time. When the link is deactivated data exchange is not possible. As shown in FIG. 3, there are three different operation modes in which the activated link can exist, i.e., an Idle mode, a Normal mode, and an Fbus mode.

In the Idle mode the link is active but no data transmission exists. In an HW-implementation (HWIM) all unnecessary circuits are powered down and clocks stopped. The link stays in this mode as long as the link is not deactivated or until data transmission begins.

Figure 4:
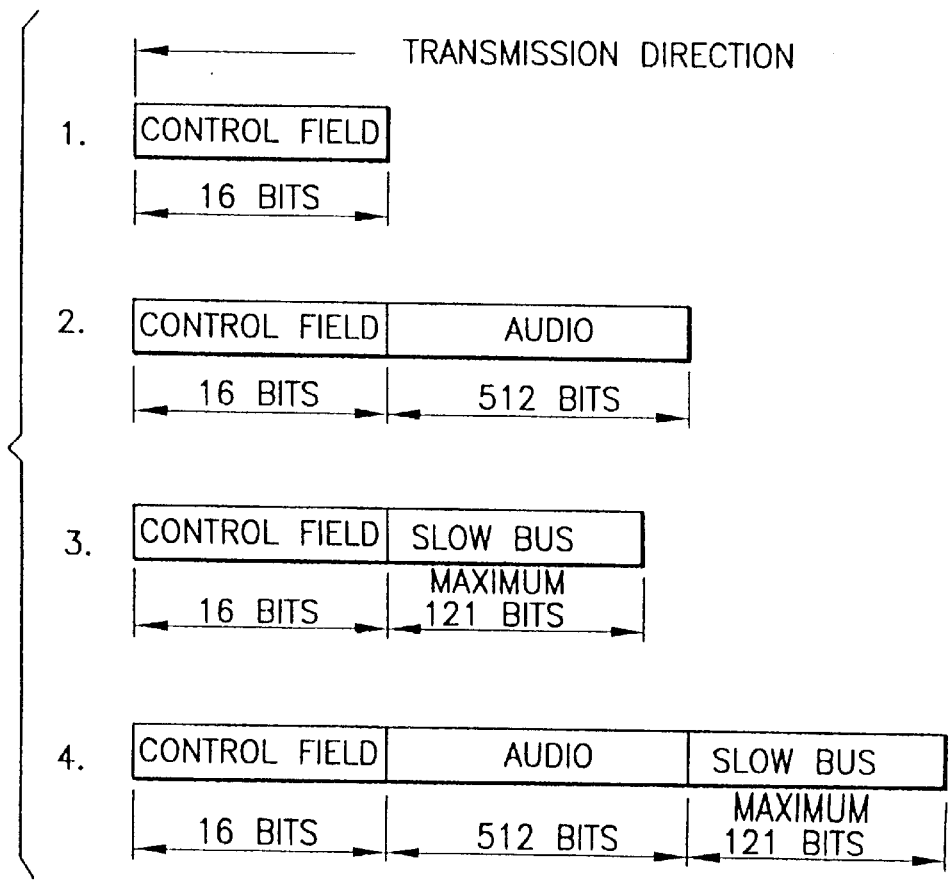
FIG. 4 illustrates examples of possible signal frame structures in the Normal mode wherein the audio data is allocated 512 bits and the MBUS-messages are allocated anywhere from 11 bits to a maximum of 121 bits.

In the Normal mode the link sends and receives control and digital audio data and slowbus-messages over the MIF. The data is transferred only when it exists and therefore the frame structure can change during transmission. Examples of possible frame structures in this mode are illustrated in FIG. 4 wherein the audio signals are allocated 512 bits and the slowbus-messages anywhere from 11 bits to a maximum of 121 bits.

In the Fastbus mode the link sends and receives fastbus-messages directly to and from the multiplexer or processor over the MIP and no low level frame is used. In this mode the protocol is defined with the software of the processor, e.g., a digital signal processor (DSP) or a von Neuman or a RISC processor, and therefore various protocols can be used.

The IR link module of the invention contains the following combination of LINK BLOCKS.

CVSD (Continuously Variable Slope Delta Modulation) Modulator:

The CVSD modulator 11 is used for analog audio signal processing to support analog phones and simple accessories. It compares the consecutive analog samples received on audio channel 17 and outputs 1 (ONE) if the value of the new sample is higher than the value of the previous one, or 0 (ZERO) if it is lower. The sampling frequency must be much higher than the upper limit of the transmitted audio band. This hardware block is simulated in the alternate implementation wherein the FIFOS, multiplexer, and control block are implemented in the processor software. Other modulation than CVSD modulation may be used, such as PCM modulation, and, in the event that the audio signals are already digitized, the audio may be put directly into the audio FIFO buffer 14.

FIFO Buffers:

The serial FIFO buffers 14 and 15 are used to temporarily store data in the audio and the slow data channels, 17 and 18. Data to be transmitted is first slowly written into the audio FIFO 14, e.g., at a 38.4 kbits/s sampling rate, by the CVSD modulator 11, and into the slowbus FIFO 15 by the slow data channel 18, e.g., at 9.6 kbits/s, and then later read and sent to the IR-block 16 at a higher rate during transmission. During externally generated data reception, the incoming data is placed at a high rate into the FIFOs, 14, 15, and then read with a lower rate and sent to the CVSD modulator 17 and the slow data channel 18. The reading and writing is controlled by the control block 12.

The size of the AUDIO buffer 14 is selected so that when the buffer is full the data will be transmitted. The modular sampling frequency is selected so that the AUDIO buffer 14 cannot overflow. The slowbus or slow data channel buffer 15 has a counter which counts the number of bytes stored in the buffer. This number is placed in the Control Field of the signal frame and transferred via the link. The receiving link fills the slowbus buffer 15 according to this number. The slowbus-messages are processed as bytes and only whole bytes are transferred. The slow data channel-protocol, defined by the host system, takes care of processing of the slowbus-frames.

MULTIPLEXER/DEMULTIPLEXER:

Multiplexer 13 is used to select a data channel for reading and writing during different locations in the frame. The multiplexer 13 is controlled by the state machine of control block 12 and selects the right number of bits from the FIFOs 14 and 15. During the Fastbus mode, the multiplexer 13 routes the fastbus-messages from the fast data channel 19 directly to the IR-block 16. The signals and data are processed by a suitable processor unit, such as, for example, a digital signal processor (DSP). Other processors such as a von Neuman or a RISC processor also may be used in implementing this function.

Figure 5:
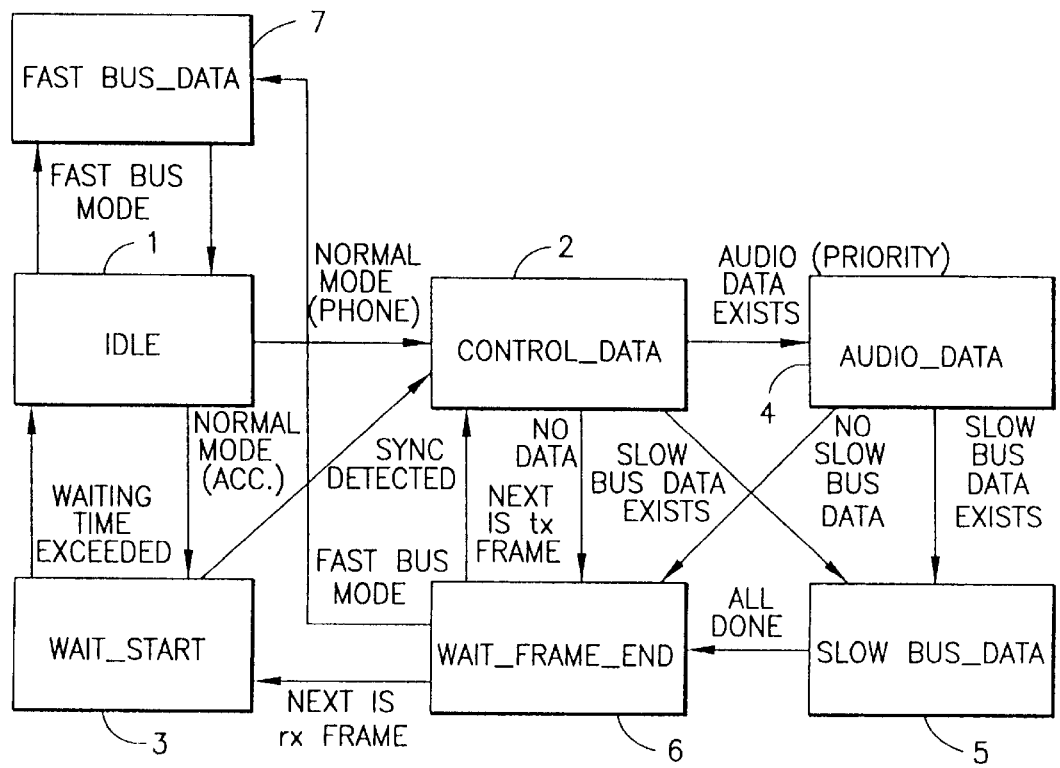
FIG. 5 illustrates the transitions of the state machine of the control block component of the link module shown in FIG. 1.

CONTROL BLOCK:

Control block 12 is used to control the operation of the link. The operation of the control block 12 is based in a state machine which controls processing of the frame and data transfer between IR-block 16 and BBIF. FIG. 5 illustrates the state machine transitions which will be described in detail below.

Figure 6:
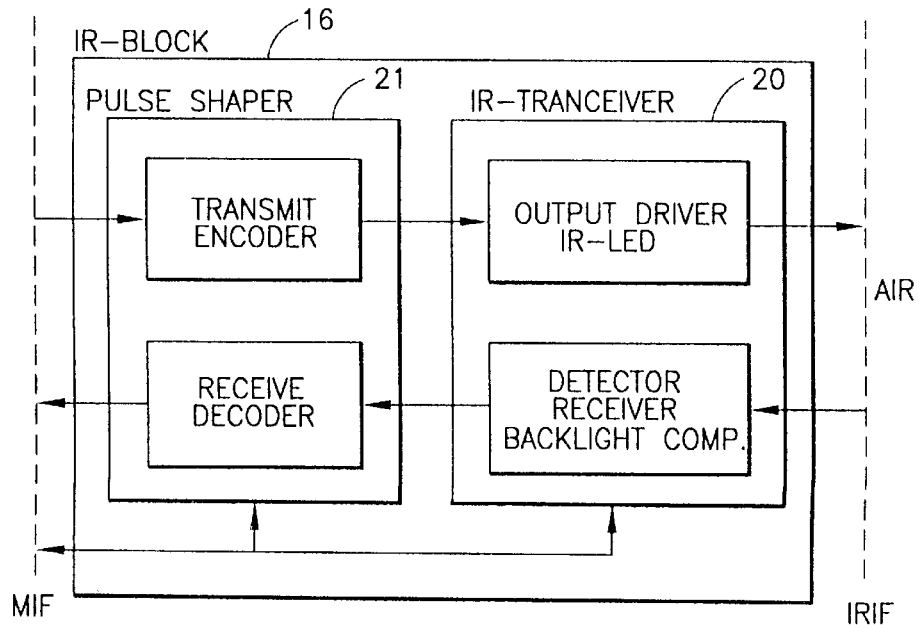
FIG. 6 is a schematic diagram of the components of the IR-block of the link module of FIG. 1.

IR-BLOCK:

The IR-block 16, as shown in FIG. 6, consists of two components, an IR-transceiver 20 and a pulse shaper 21. Commercially available IR-transceiver components may be used in this application so that the physical layer of the link may be made compatible with the IrDA standard. The IR-block 16 and multiplexer 13 are connected through the media interface MIF. The wavelength of the IR radiation is typically 850–900 $\mu$m, the maximum transmission speed is 115.2 kbits/s in one direction, and the optical link length is about 1 meter. The IR-transceiver 20 components include an IR-LED and its driver, a reception detector, a receiver, and a backlight compensation circuit. Normally only half-duplex operation is possible due to the reflections in the open space which cause receiver saturation.

Figure 7:
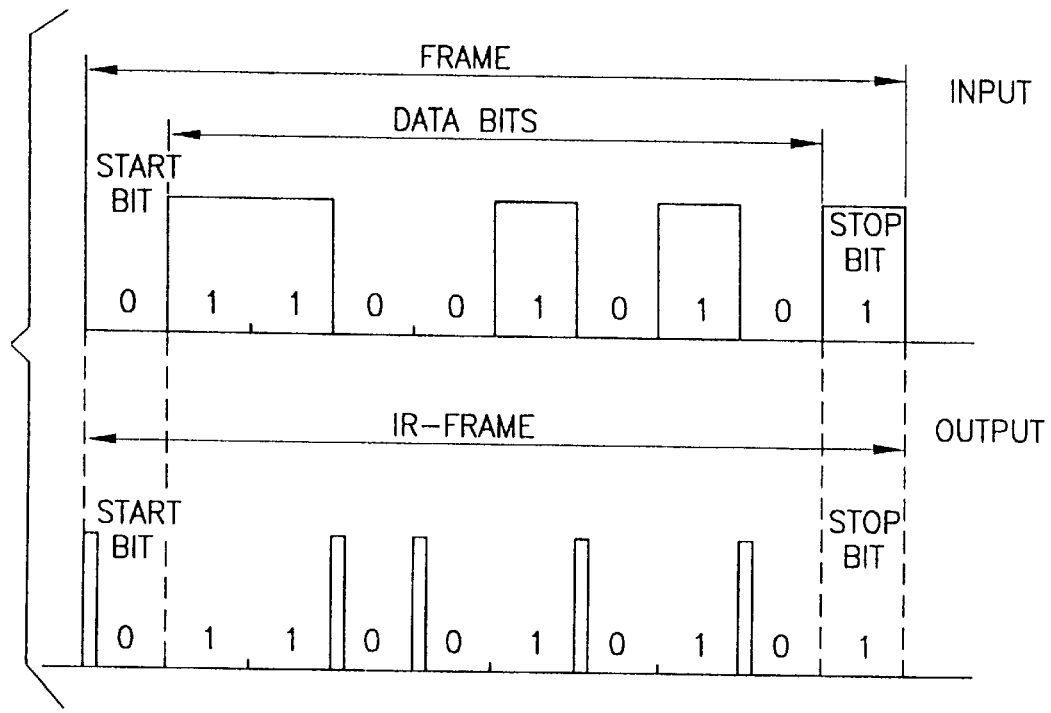
FIG. 7 illustrates an example of the serial output of the IR-block of FIG. 6 as compared to the input.

The IrDA specifications require that the bit length must be narrowed to a fraction of 3/16 of the normal bit length and that only 0 (ZERO) bits are sent. By sending only narrowed 0 (ZERO) bits power will be saved and the probability of bit errors will be reduced. Also, the IR-LED current can be increased making the operating range longer due to improved radiation power. An example of the serial output of the IR-block 16 as compared to the input is shown in FIG. 7.

OPERATING METHOD

Operation of the IR module link is based on multiplexing data from the different channel buffers and converting it into a suitable format for infrared media and reconverting it upon receipt. The compatibility problem between real time audio transmission and limitations of the commercially available IR-transceivers requires a special signal processing method. The main problem is the long receiver set-up time after transmission due to the receiver saturation.

The present invention overcomes this problem using the following solution. The audio data is collected for a longer period and then sent much faster over the link and decoded accordingly. Therefore, there is time left to change transmission direction making a full-duplex transmission possible over a half-duplex media. This solution involves the use of FIFO buffers for holding collected signals and data. In the Normal mode the slowbus data is multiplexed with the audio data in one signal frame. In the Fastbus mode the audio signal or slowbus-messages are not transmitted.

Control of the transmissions is essentially accomplished by the control block 12 in FIG. 1, the operation of which is based on a state machine that controls reading, writing and multiplexing of the data and frame processing. The state machine, the transitions of which are shown in FIG. 5, is controlled by Control Field bits in the signal frame (see FIGS. 2 and 4) and a few input signals. The Control Field bits are set when data exists in the buffers or FIFOs 14 and 15. For example, the slowbus bit is set when slowbus data exists in the slowbus buffer 15, but is reset otherwise. The output of the state machine selects the proper channel of the multiplexer 13 among the four. The Control Field is sent over the link and it controls the decoding of the frame during reception. The other input signals select how the state machine operates. For example, one signal selects the role between the master or slave device. The following table, Table A, shows the states and functions of the state machine of FIG. 5. The term "processes" means either coding or decoding of the data during transmission or reception. The same state machine is used for receiving and transmitting the frames in a mobile phone and in an accessory device.

TABLE A

States in the state machine

| State | State Name | Description |
| --- | --- | --- |
| 1 | IDLE | no transmission, sleep mode, power save, state after power on and reset |
| 2 | CONTROL-DATA | processes control field of the frame |
| 3 | WAIT-START | waits here until the next start bit is detected or the maximum waiting time is exceeded, during reception only |
| 4 | AUDIO-DATA | processes audio FIFO content |
| 5 | SLOWBUS-DATA | processes slowbus FIFO content |
| 6 | WAIT-FRAME-END | waits here until the next time slot begins, waiting time depends on the previous frame structure |
| 7 | FASTBUS-DATA | processes fastbus data (or other protocol from the processor, e.g., DSP, RISC, etc.) |

Referring to the logical functional diagram of the IR link module of FIG. 1, it will be seen that an analog audio signal coming through BBIF for transmission through IRIF is CVSD dulated in modulator 11 into digital form. In the Normal mode, data is transferred between the slow data channel and FIFO buffer 15 and the audio signals, after modulation, are transferred to FIFO buffer 14. The slow data channel driver 18 and CVSD modulator 11 write directly into the FIFOs 15 and 14. In the Fastbus mode the data is only transferred between the multiplexer 13, or its procesor, and IR-block 16 (state 7, FASTBUS-DATA in FIG. 5).

During transmission, data is put in the buffers 14, 15 and the proper control bit is set in the Control Field. If no data exists in the buffers, the state machine idles (state 1, IDLE) until transmission starts. During the transmission cycle the state machine first inserts the Control Field bits (state 2, CONTROL-DATA) and then inserts the AUDIO and slowbus buffers' data contents (states 4, AUDIO-DATA and 5, SLOWBUS-DATA) into the frame if the corresponding Control Field bit is set. After the whole frame is sent, the state machine waits until the present time slot ends (state 6, WAIT-FRAME-END). After a frame is transmitted, the state machine waits for the incoming start bit in the next frame (state 3, WAIT-START) and synchronizes into the next frame.

During the reception of externally generated signals through the IRIF, the procedure is the opposite. The externally generated incoming signal frame is decoded by the receiving link which is controlled by the Control Field bits in the frame. While the link is connected, the two control blocks at either end send and receive one after another. First the master sends a frame and then the slave responds by sending a frame back. To handle the exchange of the transmitted and received signal frames within the link module between BBIF and IRIF a media interface (MIF) is specified along with a media interface protocol (MIP) for transmitting data over this interface. The design and functioning of the MIF and MIP will be understood from the following description of the functional blocks communicating over the interface and of the state machine, which is used to control the data multiplexing.

The preferred IR link module 10 has four transmission channels for digital full-duplex audio signals (17), slowbus and fastbus-messages (18, 19), and for some control data (9) and it is intended and designed to be used as an integrated part of phones and accessories. The link is connected to the baseband of a phone or accessory through the baseband interface (BBIF). Both the phone and accessory can operate as a transmitter and receiver. The transmitter sends data through the media interface (MIF) and through the IR-interface (IRIF) between a media driver 16 and a transmission path to the receiver. The same link implementation can be used both in a phone or an accessory. As noted, the link operates according to the master/slave principle where a phone is a master and an active accessory is a slave. The slave can only respond to the master and the link has to be opened by the master.

Figure 8:
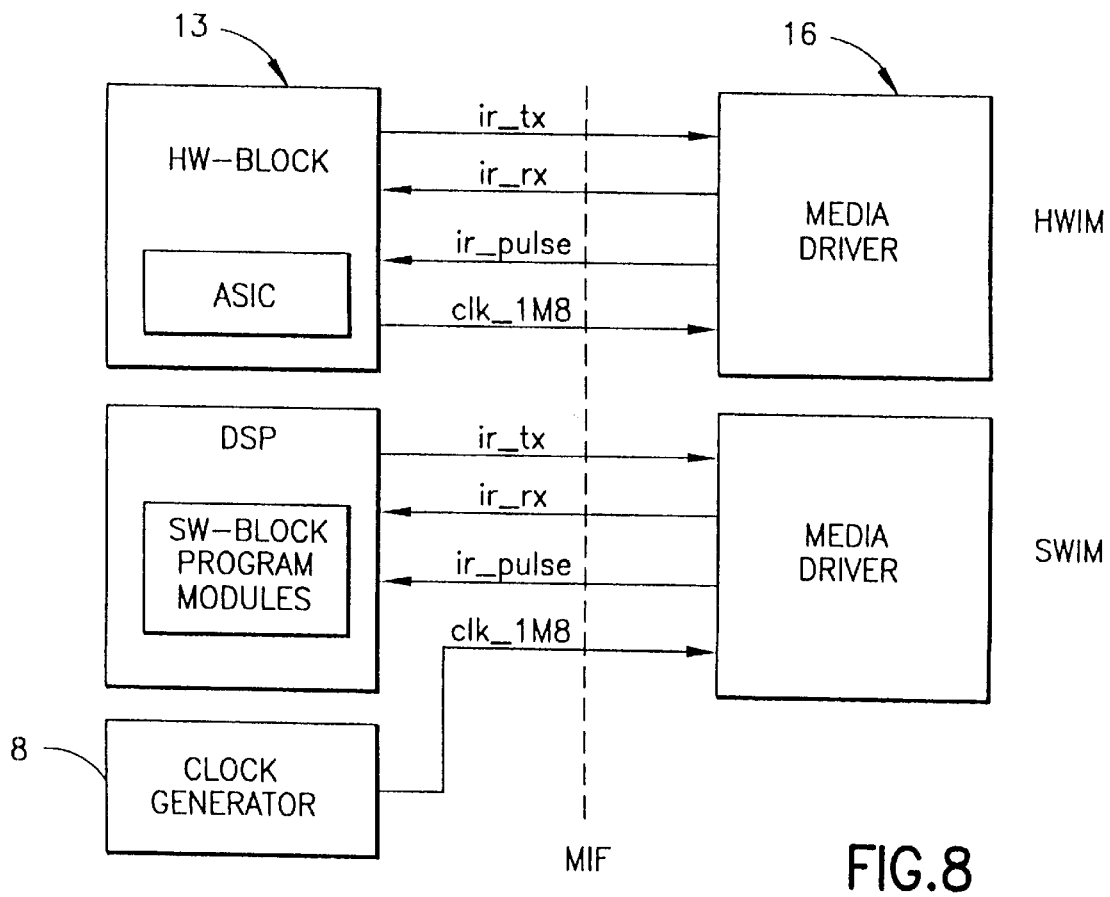
FIG. 8 is a block diagram illustrating the components on either side of the Media Interface (MIF) in the link module of FIG. 1.

Two alternate solutions for performing the same functions may be implemented. One implementation is to use a hardware based link (HWIM) that can be implemented in an ASIC chip and the other is to use a software based implementation (SWIM) that can be implemented in the software of the DSP or other appropriate processor, such as a von Neuman or RISC processor. As shown in FIG. 8, if the ASIC is used to run the data multiplexing process, it is involved with the HW-block. The processor (DSP) is involved with the SW-block that includes program modules used in multiplexing and all the other modules. The Media driver 16 is preferably implemented as an infrared block (the IR-block 16 shown in FIG. 6) including a pulse shaper 21 and infrared transceiver 20. The MIF specifies in which form and how audio signals or data are transmitted between the media driver 16 and the multiplexer 13. A common requirement for both of these is that they have to be sent to the MIF in a specific form or protocol, i.e., the MIP.

In accordance with the MIP, signals or data are transmitted as a bit stream in a serial form through the MIF. A half-duplex transmission is used over the MIF, i.e., signals or data can be transmitted in both directions, but only in one direction at one time. This requirement is dictated by the infrared transceiver 20 of the IR-block 16. The multiplexer 13 is used both to send signals and data and demultiplex received signals and data, and one cycle of the multiplexer sequence is so fast that a user perceives the communication as full-duplex transmission.

Transmission can be transmitted in two modes, i.e., the Normal mode and the Fastbus mode. The Normal mode is used in a voice call to send and receive control, audio, and slowbus data over the link and the Fastbus mode is used in a data call for fastbus data transmission. Audio and slowbus data cannot be sent simultaneously with fastbus data, because all the capacity of the link is needed to send fastbus data. In the Normal mode, audio and data are transmitted using the MIP frame, but in the Fastbus mode a specific frame structure is not needed since data is transmitted directly between the fast data channel 19 and the MIF via the multiplexer 13.

Audio and data are preferably sent over the MIF at a constant nominal data rate of 115.2 kbits/s. The signals could be sent at a different data rate by a phone and/or accessory, but at the lower data rate in the Normal mode audio quality is not high enough. The higher data rate is not possible in the IR link module again because of the infrared transceiver component. Audio and slowbus data are transmitted over the link in a signal frame including a Data Field and a Control Field (FIG. 2). The Control Field consists of 16 control bits and the Data Field contains a maximum of 640 bits. A useable data rate for audio data is 38.4 kbits/s and for slowbus data is 9.6 kbits/s. The phone and accessory can send slowbus-messages using different data rates, but the 9.6 kbits/s data rate is preferred.

Audio data is coded in the CVSD modulator 11 using a sigma delta modulation. Thus, if the value of a current bit is set to 1 (ONE), it indicates that the current sample value is one step higher than the previous one. A 0 (ZERO) means the current value is one step lower than the previous sample value. The sampling frequency is 38.4 kbits/s and, as indicated in FIG. 4, 512 bits are reserved for audio signals in one signal frame. It should be noted that slow data channel and fast data channel protocols take care of the data channel processing, such as the detection of transmission errors and the resending of frames, etc., which are not included in the MIP.

MEDIA INTERFACE PROTOCOL

The media interface protocol (MIP) defines the frame structure used in audio and data transmission. As seen in FIG. 4, a frame consists of three possible fields, i.e., Control, Audio, and Slowbus Fields. The contents of the frame depend on the transmitted data. The Control Field contains information about the structure of the frame and is read or written by the control block 12 in the HWIM and by program modules in the SWIM. FIG. 4 illustrates all possible frame structures in the Normal mode.

The frame is sent or received during a time slot within one cycle of the state machine. Time reserved for one bit can be calculated by taking an inverse of a data rate of 115.2 kbits/s, that is, 8.68 μs. A bit rate of 115.2 kbits/s also means that 57.6 kbits are sent in one direction during one second. The requirement for the data rate in audio sending is 38.4 kbits/s and in slowbus data sending is 9.6 kbits/s giving a total of 48.0 kbits/s, so that (57.6−48.0=) 9.6 kbits are available for transmission in one direction during one second. Thus, the 16 bits of control data in the Control Field of each signal frame and the bits needed for changing the direction of transmission, must be included in this number. The time required by the infrared transceiver 20 to change transmission direction is called latency time. According to the IrDA specification, latency time may not exceed 10 ms. In the present IR link module an infrared transceiver 20 with a latency time of 0.8 ms is preferred. A time value of 1.0 ms may be selected for calculation purposes taking a safety factor into account. The control of multiplexing can be performed with 16 bits and thus the Control Field includes 16 bits.

The number of bits in the Data fields of the frame is selected according to the relationship of the data rates and the size of the FIFO registers 14 and 15. While the data rate of audio signals is four times higher than the data rate of slowbus data, all bits are transmitted at 115.2 kbits/s. The slowbus FIFO 15 has to be capable of storing 121 bits, because 121 bits have to be transmitted in the slow data channel or slowbus field over the MIF during one cycle of the state machine. According to the data rates relationship then, 512 bits are reserved for audio data. The exact number of bits for a time slot spacing or ending is calculated so that a clock signal can be easily divided from an existing clock signal. The divider must be an integer. 112 bits are chosen (16*7=112). The whole MIP frame structure is presented in the following table, Table B.

TABLE B

Information about fields of a MIP frame

| Field | Length | t/ms | Meaning of the field |
|---|---|---|---|
| Control | 16 | 0.139 | Send control data |
| Audio | 512 | 4.444 | Send audio data |
| SLOWBUS | 121 | 1.052 | Send slowbus data |
| Rest | 112 | 0.972 | Change writing/reading mode |
| Total | 761 | 6.605 | |

CONTROL FIELD

The Control Field is created by a sending control block. The bits of the field are set according to signals from different sources. The receiving demultiplexer (13) is controlled by this field whereby the received data is demultiplexed to outgoing channels according to the values of the bits. The Control Field structure is presented in the following table, Table C.

TABLE C

Structure of the Control Field

| 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| S | B | MB | A | H | D1 | D2 | D3 | D4 | C1 | C2 | C3 | C4 | R1 | R2 | R3 |

The Control Fild is sent from left to right as viewed in Table C. The abbreviations in Table C are explained in the following table, Table D, and text. In the column "Explanations" the allowed bit values are presented. The character "x" means that the bit value can be 0 (ZERO) or 1 (ONE).

TABLE D

Explanations for abbreviations

| Abbreviations | Signal | Explanation |
|---|---|---|
| S | Sync-det | 0: Beginning of the frame |
| FB | Fbus-en | 0: Fastbus mode selected |
| | | 1: Fastbus mode not selected |
| SB | Sbus-en | 1: Not in use |
| A | Audio-en | 0: Audio data to send |
| H | Hook-en | 0: Call activated in the accessory device |
| | | 1: Call not activated in the accessory device |
| D1,D2,D3,D4 | | x,x,x,x:Bits for a device identification |
| C1,C2,C3,C4 | | x,x,x,x:SBUS bytes to send or receive (counter value) |
| R1,R2,R3 | | 1: Reserved for future use |

(ONE) in the bit sequence indicates that the new sample is one step higher than the previous one and a value of 0 (ZERO) indicates that it is one step lower. Sigma delta modulation is done by the CVSD modulator 11 in the HWIM. Alternatively, in the SWIM, a CVSD modulator is simulated in the processor (DSP) software. In the case where audio data does not exist a bit sequence 01010101 ... is sent.

SLOWBUS FIELD

The basic unit of transmitted slowbus data is a byte, which consists of 11 bits according to the following table, Table E.

TABLE E

| Bits of the Slowbus byte. | | | | | | | | | | |
|---|---|---|---|---|---|---|---|---|---|---|
| 1 | 2 | 3 | 4 | 5 | 6 | 7 | 8 | 9 | 10 | 11 |
| Start | Data | Data | Dat | Data | Data | Data | Data | Data | Party | Stop |

The start bit (S) indicates the beginning of the frame and is always set to 0 (ZERO). When a device is ready to receive a frame, it stays in the state WAIT-START and observes the value of the line. When the bit S is detected the frame reading starts. The line is read until the whole frame is read completely whereupon one cycle of the state machine is done.

The fastbus data bit (FB) is set to zero when a data call is selected. The slowbus data bit (SB) may be reserved for future applications and preferably is always set to 1 (ONE) in the present link module.

The audio bit (A) informs the control block 12 about sending or receiving audio data. If the value is set to 0 (ZERO), the audio field is written into the frame or read from the frame. In the case where the value 1 (ONE), the state AUDIO-DATA for reading/writing audio data is passed.

When a call is activated in the accessory device, a hook signal pulse is generated. To inform a phone about the activated call the hook bit (H) is set to 0 (ZERO). When the phone receives the Control Field and it indicates that the hook bit is set to 0 (ZERO), the hook signal is generated in a phone.

The device bits (D1, D2, D3, D4) identify a particular phone or accessory device. A mobile phone sends, at the start of connection, the Control Field to the accessory device to be connected. The device bits are set to 1 (ONE). The accessory device reacts and answers by sending a Control Field frame to the phone. The Control Field includes the unique device identification bits.

The four slowbus counter bits (C1, C2, C3, C4) are used to inform the receiving control block about the number of slowbus bytes in the incoming frame structure. If all bits are set to 0 (ZERO), no slowbus bytes are read by the receiving multiplexer.

The last three parameters (R1, R2, R3) are reserved for future use and preferably are set to 1 (ONE).

AUDIO FIELD

The Audio Field preferably includes 512 bits of audio data and all 512 bits are significant. When, as explained above, the sigma delta modulation method is used, a value of 1

Counter bits in the Control Field of the frame are filled according to how many bytes of slowbus data are sent. The number of sent bytes can vary from 0 to 11 because 121 bits are reserved for slowbus data in the frame and the number of significant bits varies from 0 to 121. The insignificant bits are set to 1 (ONE) and are not sent by the media driver 16.

The sending and receiving of data in the foregoing forms is controlled by a control block, including a state machine, and a multiplexer and demultiplexer, in accordance with the invention, which components function as follows in the preferred link modules.

CONTROL BLOCK STRUCTURE AND FUNCTION

The structure and function of the control block 12 depends on which of the two implementations of the link is used. In the HWIM the control block 12 is a physical component and in the SWIM it is part of program modules in the processor code. In both of these implementations the control block operation is based on that of the state machine. The block 12 controls the operations of the multiplexer 13 and it is controlled by the Control Field of the MIP frame during reception. During transmission it is controlled by incoming data and a few input signals from the BBIF.

MULTIPLEXER/DEMULTIPLEXER STRUCTURE AND FUNCTION

Figure 9:
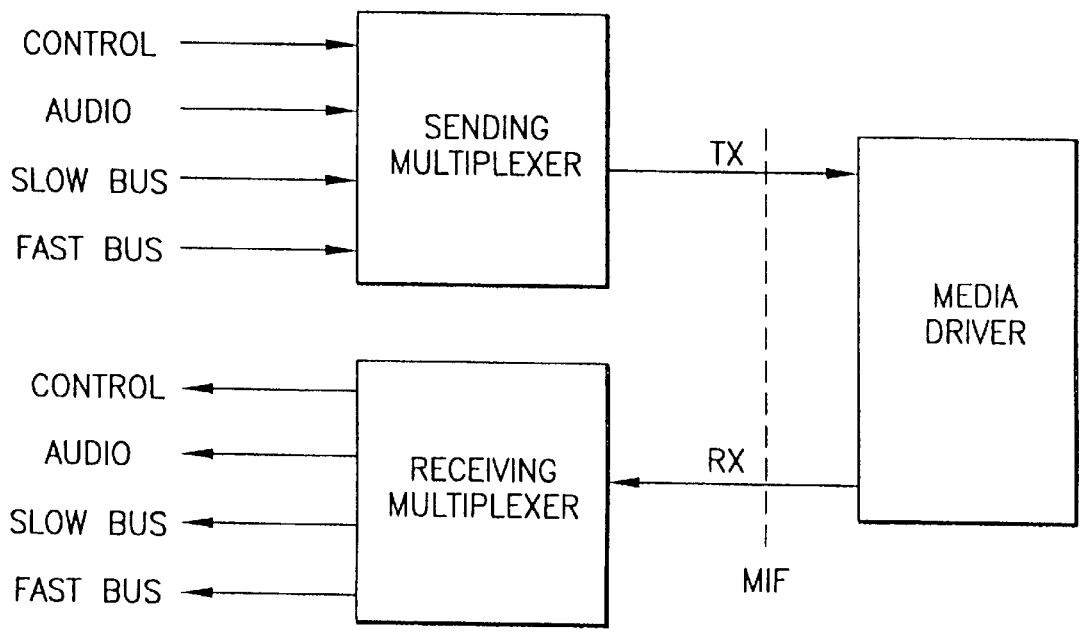
FIG. 9 illustrates data transmission across the MIF when sending (TX) and receiving (RX) data from and for the four data channels.

The structure and function of the multiplexer 13 also depends on the desired implementation. In the HWIM, the multiplexer and demultiplexer is implemented in the ASIC and in the SWIM multiplexing is performed by program modules associated with the processor (DSP) as illustrated in FIG. 8. In either event, the multiplexer/demultiplexer 13 is used to both send and receive data. When sending data, the multiplexer 13 acts to select incoming data from four possible data channels, i.e., the audio channel 17, the control channel 9, the slow data channel 18, and the fast data channel 19, and to multiplex and send data to the media driver 16 over the MIF. When receiving externally generated data, the demultiplexer 13 reads data from the MIF and demultiplexes and sends the data to the four channels. These functions are generally illustrated in FIG. 9.

The multiplexer 13 has three operation modes depending on the data. The Fastbus and Normal modes are used in data transmission and mode Idle is used when no data transmission exists. All three possible modes of the multiplexer are shown in FIG. 5.

An Idle mode is set when the link is initialized or reset. In this mode the link is powered ON but no data transmission exists. After a specific time, e.g., 4 seconds, clocks are stopped to save power. When a user wants to send data, he or she can select either the Normal mode or Fbus mode. When data is sent or the user wants to finish data transmission, the Idle mode is initialized again.

In the Normal mode, when sending control, audio, and slowbus data to the MIF, the multiplexer 13 is used to create a specific frame structure defined by the MIP. After sending the control bits, the multiplexer collects signal or data bits from the audio and slow data channels and sends these bits to the MIF. In the case of receiving data from the MIF, the demultiplexer creates an incoming frame defined by the MIP for the data input to the audio and slow data channels, 17 and 18. The control, audio, and slowbus bits from the incoming frame are demultiplexed according to the control bits, and the audio and slowbus data is generated.

In the Fastbus mode data is sent directly through the multiplexer 13 and the MIP frame structure is not needed. The only task of the multiplexer is to route data from the processor to the MIF for fastbus data transmission.

STATE MACHINE

The state machine is needed to control multiplexing and demultiplexing of the data. The Control Field of the frame is used to control the operation of the state machine in the Normal mode during reception. The identical state machine is used to send and receive data in both a phone and accessory device.

Figure 10:
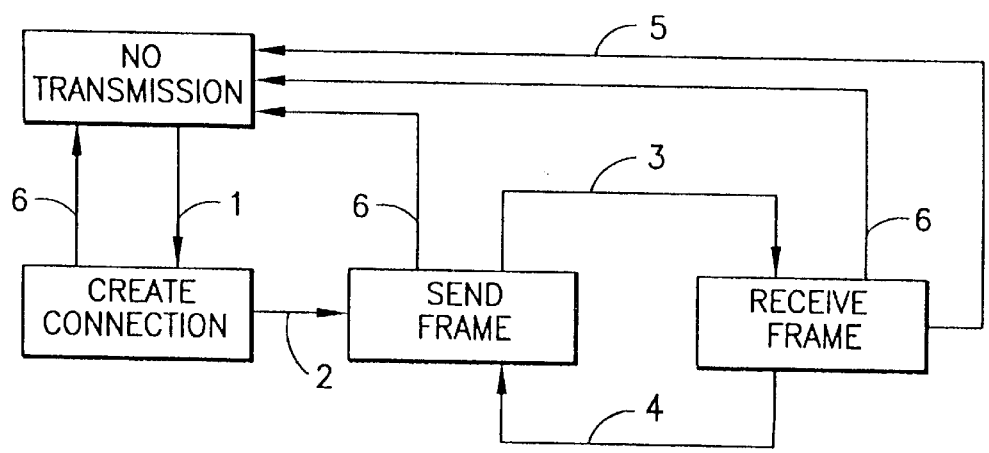
FIG. 10 illustrates data transmission in the Normal mode between a phone and an accessory over the transmission link.

In the Normal mode the connection between a phone and an accessory device is created after the mode has been selected. When the connection is successfully created, both devices take turns sending and receiving. The user ends the connection. FIG. 10 illustrates data transmission in the Normal mode according to the following steps.
1. The Normal mode is activated by the user.
2. Connection is created successfully.
3. All fields are sent and a time slot is ended.
4. All fields are received and a time slot is ended.
5. The Normal mode is deactivated by the user.
6. An error situation occurs.

In the Fastbus mode, the fast data channel protocol creates a connection and sends data after the mode has been selected. The sending of data can be ended by the user or the fast data channel protocol may take care of ending the connection.

Creation of the Connection

Figure 11:
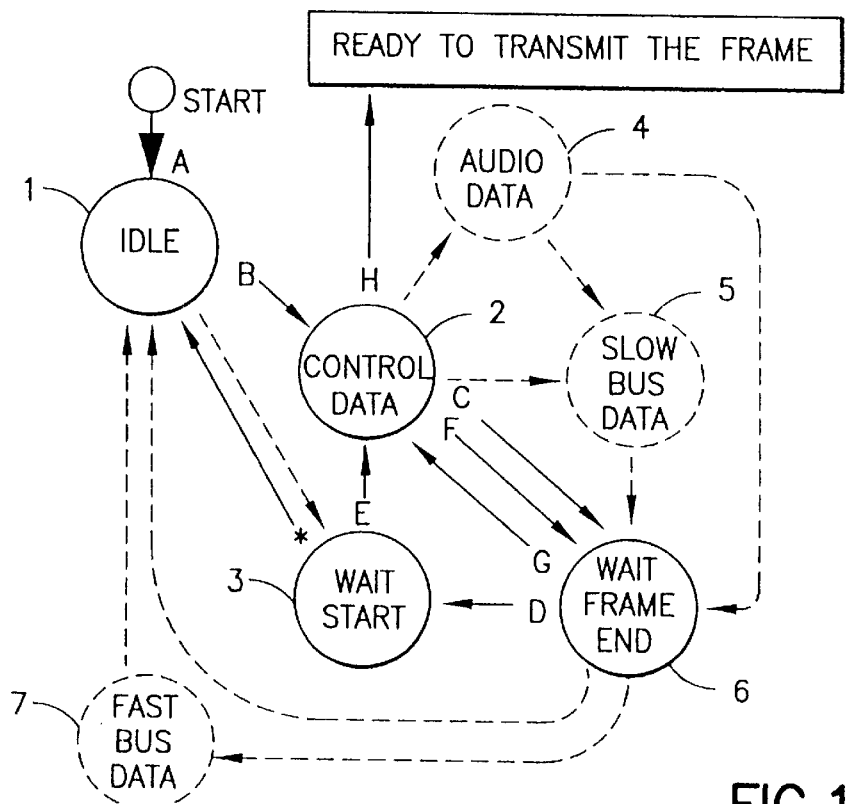
FIG. 11 illustrates the creation of a link connection in a phone in terms of state machine steps or phases.
Figure 12:
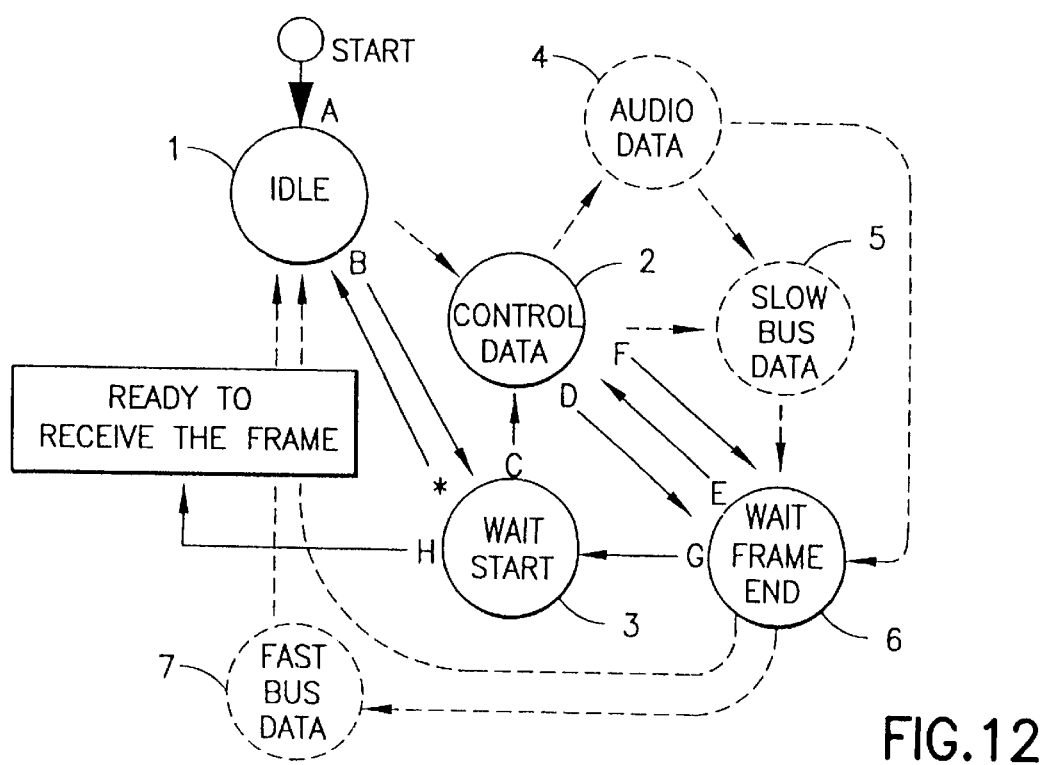
FIG. 12 illustrates the creation of a link connection in an accessory device in terms of state machine steps or phases.

When both a phone and an accessory device are powered ON ready for use, a reliable connection has to be created between them. FIG. 11 illustrates the creation of a connection in a phone in terms of state machine operation (see FIG. 5 and Table A), and FIG. 12 illustrates the similar creation of a connection in an accessory device.

The steps or phases shown in FIG. 11 are as follows for the creation of the connection in a phone.

PHONE

A. A mobile phone is turned on (START) and the state IDLE is set.
B. The user has selected the Normal mode and the writing state is set.
C. All control bits are written into the Control Field and the field is sent to the MIF.
D. The end of a time slot is reached and the reading state is set. An accessory sends the control frame to the phone.
E. A start bit of the frame is detected.
F. All control bits are read from the MIF and used to control the state machine.
G. The end of the time slot has been reached and a writing state is set.
H. The writing state is set and the connection has been created.
* A specific time for waiting for a start bit has passed. The link will try to create a connection again and return to phase B.

The steps or phases shown in FIG. 12 are as follows for the creation of the connection in an accessory device.

ACCESSORY DEVICE

A. An accessory device is turned on and the state IDLE is set.
B. The reading state is set, waiting for an incoming frame.
C. A start bit of the frame is detected.
D. All control bits are read from the MIF.
E. The end of a time slot is reached and the writing state is set. The accessory responds to the phone.
F. All control bits are written into the control field and the field is sent to the MIF.
G. The end of a time slot is reached and the reading state is set.
H. The reading state is set and the connection has been created.
* A specific time for waiting for a start bit has passed. The link will try to create a connection again and return to phase B.

DATA SENDING and RECEIVING in the Normal and Fastbus Modes

The sending and receiving of data is controlled by the state machine as will now be described. This operation is suitable for both a phone and an accessory device.

Figure 13:
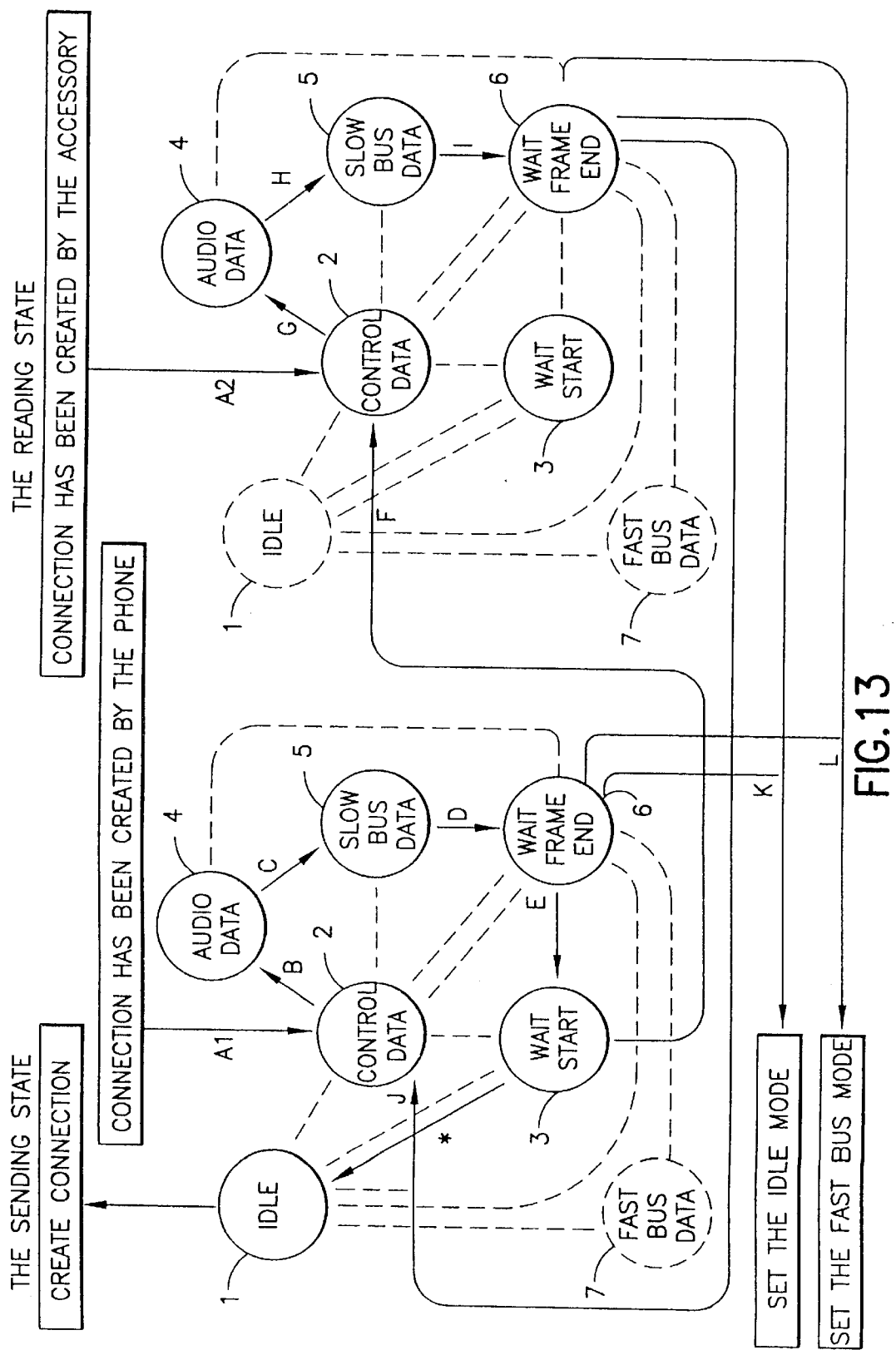
FIG. 13 illustrates the steps or phases of two consecutive cycles of one state machine for data transmission in the Normal mode.

Before data transmission, a reliable connection between the phone and accessory has to have been created successfully. The sending and reading states follow each other in the phone and accessory. When the phone is sending data to the MIF, the accessory receives data from the MIF and vice versa. FIG. 13 illustrates data transmission in the Normal mode in terms of state machine operation with control, audio, and slowbus data being transmitted.

DATA TRANSMISSION in the Normal Mode

The steps or phases shown in FIG. 13 specifically illustrate the steps or phases of two consecutive cycles of one state machine for data transmission in the Normal mode and are as follows.

START of the Normal Mode

A1. Connection has been created by a phone and the writing state is set.
A2. Connection has been created by an accessory and the reading state is set.

SENDING STATE

B. All control bits are written into the control field and are sent to the MIF.
C. All audio bits are read from the AUDIO buffer and are sent to the MIF.
D. All slowbus bits are read from the slowbus buffer and are sent to the MIF.
E. The end of a time slot is reached and the reading state is set, waiting for an incoming frame.
* A specific time for waiting for a start bit is passed.

READING STATE

F. A start bit of the frame is detected.
G. All control bits are read from the MIF. The audio bit in the control field is set to one and counter bits are set.
H. All audio bits are read from the MIF and written into the AUDIO buffer.

I. All slowbus bits are read from the MIF and written into the slowbus buffer.
J. The end of the time slot is reached and the writing state is set. Start again at phase B.

ENDING THE DATA TRANSMISSION

K. The user has terminated the voice call.
L. The user has selected the data call.

DATA TRANSMISSION in the Fastbus Mode

Figure 14:
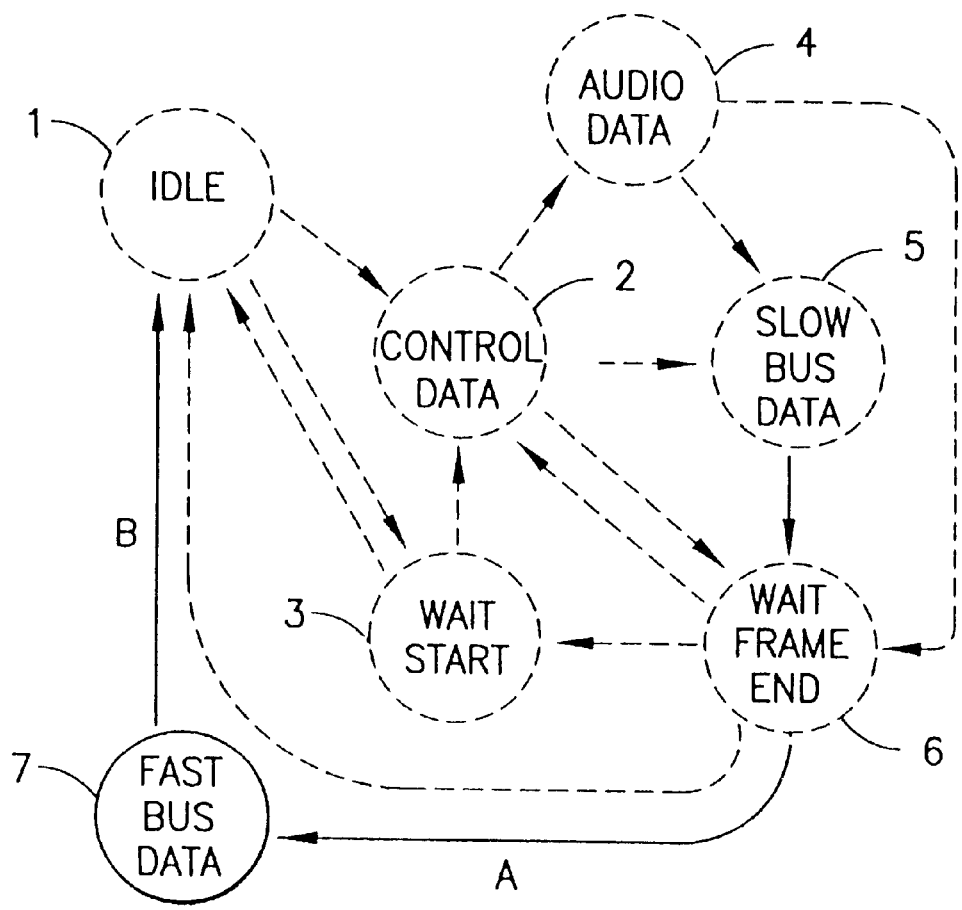
FIG. 14 illustrates the state machine steps or phases for data transmission in the Fastbus mode.

When a user selects the data call, the Fastbus mode is set to transmit fastbus data between a phone and an accessory device. Fastbus data is sent directly from the processor to the MIF or from the MIF to the processor and the MIP frame structure is not used. The fast data channel protocol takes care of the fastbus channel frame processing such as the detection of transmission errors, resending of frames, etc. FIG. 14 illustrates fastbus data transmission in the state machine.

The steps or phases shown in FIG. 14 are as follows for data transmission in the Fastbus mode.

A. The user has selected the Fastbus mode.
B. Time passes without fastus data transmission between a mobile phone and an accessory device.

It should be noted that the Fastbus mode can be selected at any time, but it can be reached only in the state WAIT-FRAME-END. When the FBUS-DATA state is changed to the IDLE state, sending of audio and/or slowbus data can continue, if the Normal mode is still active.

LOSS OF THE CONNECTION

The connection between a mobile phone or accessory device can be lost for many reasons. The transmission of infrared light can be intercepted or blocked, e.g., by a hand, and the other part of the link can be powered down, etc. In these kinds of situations the state machine's WAIT-START state can be adapted to try to make the connection again after a specified time.

PHYSICAL CONNECTIONS

The physical connections over the MIF are illustrated in FIG. 8. As seen in FIG. 8, four lines are routed from the multiplexer 13 to the media driver 16 over the MIF. Two of the lines are used in data transmission and two are needed in pulse creation and control. The same lines are implemented in both the HWIM and SWIM embodiments.

Data is transmitted from the multiplexer 13 to the media driver 16 for external transmission via the line ir__tx, and received externally generated data from the media driver 16 to the multiplexer 13 is transmitted via the line ir__rx. The media driver 16 informs the multiplexer 13 about incoming data, detected by the detector-receiver-backlight component in the IR-transceiver 20, via the line ir__pulse. The line clk__1M8 is used to create pulses in the pulse shaper 21 component of the driver 16.

The only difference between the HWIM and SWIM concerning the MIF is the source of the line clk__1M8 clock signal. In the HWIM, the signal is taken from a pin of the ASIC, while in the SWIM the signal can be taken from any suitable source, e.g., from a clock generator 8. The requirements for signal clk__1M8 call for the clock frequency to be 1.8 MHz and the source of this signal to be synchronized with the 115.2 kHz clock to guarantee the correct functioning. It will accordingly be seen that a system or module is presented that is capable of utilizing a wired or wireless digital link which apparently transmits audio and data in full-duplex mode between a radio or mobile phone and its accessories while using a conventional half-duplex IR-transceiver. In alternative applications an RF transceiver might be substituted.

What is claimed is:

1. Apparatus capable of apparent full-duplex signal transmission, comprising:

conductor means for conducting input digital signals and output digital signals at a first rate;

buffer means, coupled to said conductor means, for storing said input digital signals received from said conductor means at said first rate;

a multiplexer, coupled to said buffer means, for reading and transmitting said input digital signals stored in said buffer means at a second rate faster than said first rate; and a media driver, coupled to said multiplexer, for converting said input digital signals transmitted by said multiplexer into signals for external transmission;

and wherein:

said media driver receives and converts externally generated signals into received digital signals in a half-duplex mode with said input digital signals transmitted by said multiplexer;

said multiplexer transmits said received digital signals from said media driver and stores said received digital signals in said buffer means at said second rate;

said conductor means receives at said first rate said received digital signals stored in said buffer means and outputs said received digital signals as said output digital signals at said first rate; and control means for controlling said first and second rates such that the storing of input digital signals by said buffer means and the outputting of output digital signals by said conductor means are timed to appear to be in full-duplex mode.

2. Apparatus as in claim 1 wherein said input and output digital signals comprise audio signals and further comprising:

slow data channel means for providing slowbus-messages;

a slow data channel buffer means, coupled to said slow data channel means, for storing slowbus-messages provided by said slow data channel means at a third rate slower than said second rate, and coupled to said multiplexer for transmitting slowbus-messages stored in said slow data channel buffer means to said multiplexer for multiplexing with said input digital audio signals.

3. Apparatus as in claim 2 wherein said control means comprises:

a receiving state machine; and means for producing a signal frame that controls said receiving state machine, said signal frame including a control field and a data field, said data field comprising digital audio signal indicative bits and slowbus-message indicative bits.

4. Apparatus as in claim 3 further comprising:

a media interface, coupling said multiplexer and said media driver, for conducting said signal frame back and forth thereacross between said multiplexer and said media driver.

5. Apparatus as in claim 1 further comprising:

fast data channel means for providing fastbus-messages to said multiplexer; and wherein said media driver comprises means for converting said fastbus-messages received from said multiplexer into data signals for external transmission.

6. Apparatus as in claim 1 wherein said buffer means comprises a FIFO register.

7. Apparatus as in claim 1 wherein said media driver comprises one of an IR transceiver and an RF transceiver.

8. Apparatus as in claim 1 further comprising:
   a modulator, coupled to said conductor means, for converting said input and output digital signals to analog signals.

9. Apparatus as in claim 8 wherein said digital and analog signals comprise audio signals and further comprising:
   slow data channel means for providing slowbus-messages;
   slow data channel buffer means for storing said slowbus-messages at a third rate slower than said second rate, and coupled to said multiplexer for transmitting said slowbus-messages stored in said slow data channel buffer means to said multiplexer for multiplexing with said digital audio signals;
   means for providing fastbus-messages to said multiplexer; and
   wherein said media driver comprises means for converting said fastbus-messages received from said multiplexer into data signals for external transmission; and
   interface means, connectable to a phone, for transferring said analog audio signals, slowbus-messages, and fastbus-messages between said phone and said modulator, said slow data channel buffer means, and said means for providing fastbus-messages, respectively.

10. Apparatus for use in a system capable of audio and data transmission, comprising:
    audio channel means for conducting input audio signals and output audio signals;
    slow data channel means for conducting slowbus-messages;
    interface means for conducting said input and output audio signals and slowbus-messages thereacross;
    media driver means for converting said input audio signals and slowbus-messages to audio and data signals capable of external transmission and converting received externally generated audio and data signals to output audio signals and slowbus-messages;
    first buffer means for storing said input and output audio signals;
    second buffer means for storing said slowbus-messages;
    multiplexing means, coupling said media driver means to said first and second buffer means in half-duplex mode, for transmitting said stored input audio signals and said stored slowbus-messages from said first and second buffer means to said media driver means at a faster transmission rate than the respective rates at which they have been stored by said first and second buffer means, and for transmitting output audio signals and slowbus-messages from said media driver means to said first and second buffer means at said faster transmission rate; and
    means for controlling the difference between said faster transmission rate and the storing rates by which said input and output audio signals and said slow-bus messages have been stored by said first and second buffer means to produce input and output audio signal and slowbus-message transmission across said interface means appearing to be in full-duplex mode.

11. Apparatus as in claim 10 wherein said interface means conducts analog input and output audio signals thereacross and further comprising:
    means, connected between said interface means and said first buffer means, for coding said analog input audio signals and producing digital input audio signals based thereon for storing in said first buffer means, and for sampling digital output signals from said first buffer means and producing analog output audio signals based thereon for conducting by said interface means.

12. Apparatus as in claim 10 wherein said means for controlling comprises:
    a state machine; and
    means for producing a signal frame that controls said state machine, said signal frame including a control field and a data field, said data field comprising audio signal indicative bits and slowbus-message indicative bits.

13. Apparatus as in claim 12 further comprising:
    media interface means, coupling said multiplexer means and said media driver means, for conducting said signal frame back and forth thereacross between said multiplexer means and said media driver means.

14. A method of controlling signal transmission to appear to be full-duplex signal transmission, comprising the steps of:
    storing input digital signals at a first rate in a buffer;
    reading and transmitting said input digital signals stored in said buffer at a second rate faster than said first rate; and
    converting said input digital signals transmitted at said second rate into signals capable of external transmission;
    receiving and converting externally generated signals into received digital signals in a half-duplex mode with said input digital signals converted in said converting step;
    transmitting and storing said received digital signals in said buffer at said second rate;
    reading out at said first rate said received digital signals stored in said buffer; and
    controlling said first and second rates such that the storing of input digital signals and the reading out of received digital signals are timed to appear to be in full-duplex mode.

15. The method of claim 14 wherein said input digital signals are produced by modulating analog signals and said received digital signals are modulated into analog signals.

16. The method of claim 15 wherein said analog and digital signals comprise audio signals and further comprising the steps of:
    providing slowbus-messages;
    storing said slowbus-messages at a third rate, slower than said second rate, in a slowbus-message buffer; and
    reading and transmitting said stored slowbus-messages from said slowbus-message buffer at said second rate and converting said slowbus-messages into data signals with said digital audio signals for external transmission therewith.

17. The method of claim 16 wherein said controlling step is implemented with a state machine, and comprises:
    producing a signal frame that controls said state machine, said signal frame including a control field and a data field, said data field comprising audio signal indicative bits and slowbus-message indicative bits.

18. The method of claim 15 wherein said modulating comprises one of CVSD modulation and PCM modulation.

19. The method of claim 14 further comprising the steps of:

providing fastbus-messages; and converting said fastbus-messages into data signals for external transmission when not converting said input digital signals.

20. The method of claim 14 wherein said buffer comprises a FIFO register.

21. The method of claim 14 wherein said signals capable of external transmission and said externally generated signals comprise IR signals.

22. A method of controlling transmission in a system capable of audio and data transmission, comprising the steps of:

receiving analog audio signals and data-containing slowbus-messages;

providing an interface for conducting analog audio signals and data-containing slowbus-messages back and forth in first and second directions thereacross;

converting said analog audio signals conducted in said first direction to digital audio signals based thereon;

storing said digital audio signals in a first buffer at a first rate;

storing said slowbus-messages conducted in said first direction in a second buffer at a second rate;

converting digital audio signals and slowbus-messages conducted in said first direction and respectively stored in said first and second buffers to audio and data signals based thereon for external transmission;

transmitting said stored digital audio signals and stored slowbus-messages from said first and second buffers by half-duplex multiplexing, at a third transmission rate faster than said first and second rates at which they have been stored in said first and second buffers, when converting to audio and data signals for external transmission;

receiving externally generated audio and data signals;

converting received externally generated audio and data signals to digital audio signals and slowbus-messages based thereon for storing respectively in said first and second buffers; transmitting said digital audio signals and slowbus-messages converted from received externally generated audio and data signals, by half-duplex multiplexing at said third transmission rate to said first and second buffers for storage respectively therein, when converting;

conducting said stored digital audio signals converted from received externally generated audio signals, from said first buffer in said second direction at said first rate to said interface and converting said stored digital audio signals to analog audio signals based thereon before crossing said interface;

conducting said stored slowbus-messages converted from received externally generated data signals, from said second buffer in said second direction at said second rate to said interface; and controlling the difference between said third transmission rate and said first and second rates to produce analog audio signal and slowbus-message transmission across said interface appearing to be in full-duplex mode.

23. The method of claim 22 wherein said input analog audio signals are modulated by one of CVSD modulation and PCM modulation.

24. The method of claim 22 wherein said controlling step is implemented with a state machine, and comprises:

producing a signal frame that controls said state machine, said signal frame including a control field and a data field, said data field comprising digital audio signal indicative bits and slowbus-message indicative bits.

25. The method of claim 24 further comprising the step of:

providing a media interface for conducting said signal frame back and forth thereacross respectively for said half-duplex multiplexing.

* * * * *